US005668068A

United States Patent [19]
Prochazka

[11] Patent Number: 5,668,068
[45] Date of Patent: Sep. 16, 1997

[54] SINTERED SILICON CARBIDE AND METHOD OF MAKING

[75] Inventor: Svante Prochazka, Ballston Lake, N.Y.

[73] Assignee: General Electric Company, Schenectady, N.Y.

[21] Appl. No.: 754,911

[22] Filed: Nov. 22, 1996

Related U.S. Application Data

[63] Continuation of Ser. No. 538,148, Oct. 2, 1995, abandoned.

[51] Int. Cl.⁶ ............................................. C04B 35/56
[52] U.S. Cl. .................................... 501/88; 501/92
[58] Field of Search ................ 423/345; 428/902, 428/374; 501/88, 92, 93

[56] References Cited

U.S. PATENT DOCUMENTS

| | | | |
|---|---|---|---|
| 4,123,286 | 10/1978 | Coppola et al. | 106/44 |
| 4,526,734 | 7/1985 | Enomoto | 264/13 |
| 4,529,575 | 7/1985 | Enomoto et al. | 423/345 |
| 4,537,735 | 8/1985 | Enomoto et al. | 264/63 |
| 4,756,482 | 7/1988 | Matje et al. | 241/16 |
| 4,775,393 | 10/1988 | Boecker et al. | 51/293 |
| 4,932,166 | 6/1990 | Boecker et al. | 51/293 |
| 5,108,461 | 4/1992 | Ruthner | 23/313 R |

FOREIGN PATENT DOCUMENTS 289 751 A5   5/1991   German Dem. Rep. .

OTHER PUBLICATIONS

"Silicon Oxycarbide Glasses: Part I. Preparation and Chemistry", GM Renlund, S. Prochazka, RH Doremus, J. Mater. Res., vol. 6, No. 12, Dec. 1991, pp. 2716–2722.

"Silicon Oxycarbide Glasses: Part II. Structure and Properties", GM Renlund, S. Prochazka, RH Doremus, J. Mater. Res., vol. 6, No. 12, Dec. 1991, pp. 2723–2733.

*Primary Examiner*—Deborah Jones
*Assistant Examiner*—Amy M. Harding
*Attorney, Agent, or Firm*—Noreen C. Johnson; William H. Pittman

[57] ABSTRACT

A method for refined silicon carbide powder comprises attrition milling silicon carbide material in a liquid medium with a milling media to obtain refined silicon carbide particles having a specific surface area of at least 15 $m^2/g$, and preferably 20 $m^2/g$, with a median particle size of less than 0.5 microns, and preferably 0.25 microns. The invention includes the finished powder.

8 Claims, No Drawings

SINTERED SILICON CARBIDE AND METHOD OF MAKING

This application is a Continuation of application Ser. No. 08/538,148 filed Oct. 2, 1995, now abandoned.

This invention was made with government support under Contract No. NAS3-26385. The government may have certain rights to the invention.

FIELD OF THE INVENTION

This invention relates to a sintered silicon carbide fiber and particularly relates to the grinding of silicon carbide particles to a submicron size with low oxygen content. The invention also relates to a method of making sintered silicon carbide fibers with improved strength by attrition grinding of silicon carbide particles to refined submicron sizes using boron carbide as a milling media, forming a silicon carbide fiber, and sintering the silicon carbide fiber at reduced sintering temperatures to obtain a fine grained dense microstructure.

BACKGROUND OF THE INVENTION

There has been the need for high temperature ceramic materials in powdered form where the particle size of the powder is very small, e.g. submicron size. The ceramic powders in the submicron size, where the average particle size is less than 1 micron, are especially required for sintering operations where the powders are sintered into high temperature high strength ceramic articles. One such ceramic article that is often used for its strength is silicon carbide fibers. The strength, toughness and other properties of silicon carbide fibers are determined by their microstructure which is controlled by the manner in which they are made.

Silicon carbide fibers can be prepared by extrusion and spinning of plasticized mixtures of powder with subsequent sintering. If the silicon carbide powders used in the fiber making, contain particles substantially greater than 1 micrometer, the fibers when formed by spinning exhibit a rough surface. During deformation of the plasticized powder during shaping of the fiber, the particles are displaced and rotated causing the formation of pits and asperities in the surface. This surface roughness generated during the spinning operation is essentially preserved in sintering. There is little or no smoothing of the fiber surface by mass transport in the sintering operation. Consequently, the surface pits are sharp edged to their roots. This makes the surface pits on the fibers undesirable stress risers which may limit the tensile strength of the silicon carbide fiber.

There is a need to provide a silicon carbide fiber having a surface with reduced pits and asperities and improved strength. There is further a need to provide a silicon carbide fiber made from fine submicron size powder that provides a dense, small grain microstructure.

SUMMARY OF THE INVENTION

In accordance with the present invention, there is provided a substantially refined silicon carbide powder as a starting material for extrusion and spinning of silicon carbide fibers. The refined starting powder reduces the size of the asperities and pits formed in the surface of the fiber during spinning, which are strength controlling.

Also in accordance with the present invention, there is provided a method for grinding a silicon carbide material to a substantially refined powder in a liquid medium in an attrition mill in the presence of media for sufficient time to obtain a specific surface area of at least 15 m$^2$/g (meters square per gram) and a median particle size less than 0.5 microns.

An increase in the strength of silicon carbide fibers is obtained by using the substantially refined silicon carbide powder of this invention due to microstructural improvements obtained in the fiber. The silicon carbide powder is refined by attritor milling to obtain a preferred median particle size of 0.25 microns and no particle size larger than 1.5 microns. About 10 hours of milling in an aqueous or solvent dispersion with 1-2 millimeter dense silicon carbide beads obtains the refinement of the silicon carbide powder. Substantially finer materials may be produced by extending the milling time. Additionally, in place of silicon carbide milling beads, boron carbide (B$_4$C) grit–14+32mesh may be used as a milling media with no loss of powder refinement.

The refined silicon carbide powder of this invention shows improved sintering characteristics by reducing the sintering time and obtaining a small grain size in the dense sintered product.

DETAILED DESCRIPTION OF THE INVENTION

In accordance with the present invention, there is provided a silicon carbide powder having the characteristics of a median diameter of 0.25 microns, a specific surface area greater than 15 m$^2$/g, where less than 0.1 percent of the powder particles are greater than 1.5 microns. The silicon carbide refined powder may then be processed into a silicon carbide fiber and sintered. The refined silicon carbide powder allows dense compaction and small grain growth during sintering. A substantial reduction of sintering temperature and grain size result because of the refinement of the silicon carbide powder. Due to these microstructural improvements in the silicon carbide, an additional increase in strength may be obtained.

In general, the silicon carbide material, prior to attrition grinding, is a particulate material having an average particle size of greater than or equal to 1 micron. The silicon carbide material after grinding has an average particle size of less than 0.5 microns and preferably less than or equal to 0.25 microns.

The milling media may be the same material, such as dense sintered silicon carbide milling beads of 1-2 millimeters. Alternatively, it has been found that fused boron carbide grit–14+32mesh which is prerounded may also be used as a source of media. Further, boron carbide is the preferred media.

The liquid medium used in the grinding operation may be either water or an organic solvent or a mixture of water and solvent. Milling in water shows an oxygen level greater than 3 percent incorporated in the silicon carbide powder. This level of oxygen may subsequently interfere with sintering and promote larger grain sizes. Milling in solvents, however, shows a decreased oxygen level to 1.7% or less. Therefore, the use of solvents is preferred as the liquid medium during the grinding operation. The solvent selected should have a high enough melting point to allow freeze drying if this is the selected way of removing the solvent after the milling operation. Examples of such solvents are tertiary butyl alcohol, p-dimethylxylene, carbon tetrachloride, and cyclohexane. A preferred solvent is tertiary butyl alcohol to which about 10–15 weight percent methyl isobutyl ketone (MIBK) is added. This mixture may also improve deflocculation. Additionally, it has been found that there is no difference in the oxygen percentage in the product when milling in solvents that contain oxygen, such as tertiary butyl alcohol, in comparison to oxygen free solvents, such as p-dimethylxylene.

When using very fine silicon carbide material, it is beneficial to use stable deflocculated dispersions. Aqueous dispersions of silicon carbide may be stabilized using the addition of about 0.2 percent per solid of ammonium or sodium lignosulphonates, and adjusting the pH to about 10. During milling, the pH may shift to a lower value which is manifested by an increased viscosity and may require an adjustment by the addition of a base to maintain a pH of about 10. Colloidal stabilization in solvent dispersions during milling, is also desirable. It has been found that about 0.4% per solid of commercially available dispersants such as Emcol CC 42 and Hypermer KD1 will stabilize dispersions of silicon carbide in the t-butylalcohol-methylisobutyl ketone mixture.

A milling cycle using attrition grinding depends on the selected milling parameters such as the size of the milling media, loading of the mill, viscosity of the slurry, and its tangential velocity, and was about 10 hours with boron carbide or silicon carbide as the milling media. Ten hours of milling yielded a median particle size of less than 0.5 microns, and can include a median particle size of about 0.25 microns by adjusting the milling parameters. Also, a fraction of less than 0.1 percent by weight of the milled particles are greater than 1.5 microns. It should be pointed out that longer milling times will further reduce the median particle size.

The mixture of the milling media, silicon carbide material and liquid medium is a slurry. Upon the completion of the milling cycle, the slurry is emptied into a mesh sieve, with the mesh size chosen by one skilled in the art for the separation of the refined silicon carbide material from the milling medium. It is beneficial to use very fine mesh screen in this operation, i.e. one with 5 micrometer mesh size, to remove all possible contamination of particulate matter from the product. The slurry may then be washed down with an aqueous or solvent solution. The separated refined silicon carbide slurry is then dried by methods known in the art such as air drying or freeze drying. Upon drying, the refined silicon carbide powder may then be used to form silicon carbide fibers or other silicon carbide articles with improved strength.

Due to the refined silicon carbide particle size, the sintering temperature of the material prepared by extended attrition milling, i.e. the temperature sufficient to obtain terminal density in the compacted powder in a specific heating cycle, may drop 60° C. or more. This makes possible the refining of the grain size of the sintered product and obtains higher densities. The smaller grain size and the higher density provide stronger sintered silicon carbide ceramic material. As an example, the use of the refined silicon carbide powder in a silicon carbide fiber produces less asperities and pits in the fiber due to the small grain size and the density of the sintered fiber is increased. Table 1 lists target characteristics of a silicon carbide powder to be used for fiber spinning, a material commercially unobtainable. The following examples demonstrate the characteristics that were obtained in the process according to the invention.

TABLE 1

| Refined Powder Characteristics | |
|---|---|
| Average particle size, d μm | 0.25 |
| Percent particles >1.5 μm | <0.1% |
| Particle size distribution, (preferably a narrow cut): | −0.5 μm + 0.1 μm |
| Oxygen | <5000 ppm |
| Metals | <1000 ppm |
| Free Carbon | <1% |

EXAMPLE 1

A table-top laboratory attritor, the "Molinex 075" from the Netsch Company, was used. The milling jar was lined with RTV rubber and the agitator cams were machined from dense hot pressed boron carbide. It should be noted that the milling procedure demonstrated by these examples may further be modified to obtain optimum efficiency. For instance, the following parameters may be optimized by those skilled in the art: the charge, the ratio of charge to milling media, the rpms, and the size of the milling media. Dense silicon carbide milling beads of about 1–2 millimeters were used as milling media. Alternatively, fused boron carbide grit−14+32mesh from Exolon Company, which was prerounded, was also used as milling media. The liquid medium was either water or an organic solvent, preferably tertiary butyl alcohol to which 10–15 weight percent methylisobutyl ketone (MIBK) was added. Other solvents that were used include cyclohexane and p-xylene. Dispersants used in aqueous liquid medium include Orzan A and Polyfon H. Dispersants used in the solvent liquid medium include Emcol CC42 and Hypermer KD1.

A typical charge in 0.75 liter milling jar was about 100 grams of silicon carbide powder, 550 grams of silicon carbide milling beads or 450 grams of boron carbide milling grit, 220 ccs of liquid medium and the deflocculants. In some batches, a boron carbide addition was charged with the silicon carbide powder, which was added as a sintering additive. When using solvents as the liquid medium, a neoprene sleeve was used between the upper flange of the jar and the lower flange of the gear box. This arrangement prevented the evaporation of the solvent.

At the end of the milling cycle, the content of the jar was emptied in a 40-mesh sieve, atop a 400-mesh sieve, and the slurry was washed down with about a liter of water or solvent. About 90–95 percent recovery was usually obtained. In the aqueous slurries where water was the liquid medium, the retrieved slurry was either directly freeze dried or acidified with a few drops of dilute nitric acid to a pH of about 5, which brought about flocculation. The flocked slurry was then decanted to reduce the volume and was freeze dried. When solvents were used as a liquid medium in the milling, the recovery procedure of the silicon carbide powder was air drying.

Table 2 summarizes the measurements obtained with the milled refined silicon carbide material. The necessary refined silicon carbide powder can be obtained under the above mentioned parameters in about 10 hours. It can be seen from Table 2 that by comparing Example 4 with Example 7 or Examples 15–17 with 20–30, that the silicon carbide milling beads may be replaced by boron carbide milling grit with no loss of efficiency, provided the rpms of the milling operation are adjusted. The boron concentration caused by wear of the milling medium after 10 hours of milling at 1500 rpm was 0.6%. By comparing Examples 18–19 and 20–30, it is shown that the reproducibility of the process is very good.

EXAMPLE 2

The effect of milling was evaluated by sintering tests. Tape casting was selected for specimen preparation. Specimens about 1×2 centimeters were sintered one at a time in a carbon boat covered with a silicon carbide slab in a carbon resistor furnace. The specimens were prepared by dispersing 50 weight percent of the dried silicon carbide refined powder in a solution of Novolac and polyvinyl butyral (Butvar 76). The specimens were fired at 2030° C., 2060° C. and 2100° C. in argon at ambient pressure. The temperature ramp was 60 minutes from room temperature to red heat, (about 650° C.), 15 minutes up to the sintering temperature, and 5 minutes holding at the sintering temperature.

Table 3 compares the characteristics of specimens sintered at 2030° C., 2060° C., and 2100° C., prepared from a silicon carbide powder used as received and milled 10 and 20 hours according to the invention. It is observed that a density of 97% was received in the specimen prepared from the 20 hours milled powder at 2030° C. while the specimen from the unmilled powder sintered to the same density at 2100° C. The average grain size at the highest density of 97% in the milled specimen was 0.79μm and in the unmilled specimen 1.74μm. This demonstrates the substantial reduction of the average grain size in the sintered product obtained by milling.

TABLE 2

| Sample | Mill time hrs. | Media | Median Particle Size | Particles >1.5 μm, % | Specific Surface m²/g | Oxygen %* |
|---|---|---|---|---|---|---|
| SiC in Water | | | | | | |
| 1 | 7 | SiC | 0.47 | 1.5 | 24.3 | — |
| 2 | 14 | SiC | 0.30 | <1.0 | 28.9 | 3.05 |
| SiC in Water | | | | | | |
| 3 | 5 | SiC | 0.36 | — | 20.5 | 2.1 |
| 4 | 10 | SiC | 0.27 | 0.0 | 26.7 | 2.55 |
| 5 | 20 | SiC | 0.20 | 0.0 | 37.2 | 3.35 |
| SiC in Water | | | | | | |
| 6 | 5 | B₄C | 0.33 | <1.0 | 18.0 | 2.3 |
| 7 | 10 | B₄C | 0.19 | 1.2 | 26.0 | 2.7 |
| SiC in t-butanol | | | | | | |
| 8 | 5 | SiC | 0.37 | — | 16.0 | 1.66 |
| 9 | 10 | SiC | 0.33 | 0.0 | 19.9 | 1.80 |
| 10 | 20 | SiC | 0.26 | 0.0 | 26.5 | 1.86 |
| SiC in cyclohexane | | | | | | |
| 11 | 5 | SiC | 0.33 | <1.0 | 19.0 | 1.6 |
| 12 | 10 | SiC | 0.30 | 0.0 | 23.9 | 1.77 |
| 13 | 20 | SiC | 0.22 | 0.0 | 29.0 | 1.80 |
| SiC in p-xylene | | | | | | |
| 14 | 10 | SiC | 0.40 | — | 20.0 | 1.61 |
| SiC in t-butanol + MIBK | | | | | | |
| 15–17 | 10 | SiC | 0.24 | 0.0 | 21.8 | 1.7 |

TABLE 2-continued

| Sample | Mill time hrs. | Media | Median Particle Size | Particles >1.5 μm, % | Specific Surface m²/g | Oxygen %* |
|---|---|---|---|---|---|---|
| SiC in t-butanol + MIBK | | | | | | |
| 18–19 | 10 | B₄C | 0.26 | 0.0 | 21.3 | 1.74 |
| SiC in t-butanol + MIBK | | | | | | |
| 20–30 | 10 | B₄C | 0.29 | 0.0 | 23.5 | 1.70 |

TABLE 3

| Firing Temperature | Measured Characteristic of Silicon Carbide Powder | Milling Time 20 hours Sample 1 | Milling Time 10 hours Sample 2 | Milling Time 0 hours Sample 3 |
|---|---|---|---|---|
| 2030° C. | avg. gr. size, μm | 0.79 | 0.90 | 1.10 |
| | max. gr. size, μm | 2.5 | 2.5 | 3.0 |
| | density, g/cc | 3.10 | (2.98) | (2.80) |
| | density, % | 97 | (93) | (87) |
| 2060° C. | avg. gr. size, μm | 0.9 | 1.03 | 1.08 |
| | max. gr. size, μm | 2.5 | 3.0 | 3.0 |
| | density, g/cc | 3.11 | 3.10 | (1.86) |
| | density, % | 97 | 97 | (92) |
| 2100° C. | avg. gr. size, μm | 1.38 | 1.25 | 1.74 |
| | max. gr. size, μm | 3.5 | 3.0 | 3.5 |
| | density, g/cc | 3.15 | 3.10 | 3.10 |
| | density, % | 98 | 97 | 97 |

What is claimed:

1. A method for making refined silicon carbide powder comprising:
   attrition milling silicon carbide material, having an average particle size before milling of greater than or equal to 1 micron, in a presence of a liquid medium and a milling media, said liquid medium is an organic solvent, water, or mixtures thereof and, said milling media selected from the group consisting of dense sintered silicon carbide beads of about 1–2 millimeter size, fused boron carbide grit–14+32mesh size, and mixtures thereof, for a sufficient amount of time to obtain refined silicon carbide particles with a surface area greater than 15 m²/g and a median silicon carbide particle size less than 0.5 microns, and where less than 0.1 percent of the refined silicon carbide particles are greater than 1.5 microns.

2. A method according to claim 1 where the liquid medium is a solvent and is selected from the group consisting of tertiary butyl alcohol, p-dimethylxylene, carbon tetrachloride, cyclohexane, methyl isobutyl ketone, and mixtures thereof.

3. A method according to claim 2 where the solvent is about 10–15 weight percent methyl isobutyl ketone and a balance tertiary butyl alcohol.

4. A method according to claim 1 where the silicon carbide particles have a surface area greater than 20 m²/g and a median silicon carbide particle size less than or equal to 0.25 microns.

5. A method according to claim 1 where the milling is performed at a pH of about 10.

6. A refined silicon carbide powder having a surface area greater than 15 m²/g and a median silicon carbide particle size less than 0.5 microns, where less than 0.1 percent of the refined silicon carbide particles are greater than 1.5 microns.

7. A refined silicon carbide powder according to claim 6 having a surface area greater than 20 m²/g and a median particle size of 0.25 microns.

8. A method for making an improved silicon carbide fiber comprising the steps of:

attrition milling silicon carbide material at a pH of about 10, having an average particle size before milling of greater than or equal to 1 micron, in a presence of a liquid medium and a milling media, said liquid medium is an organic solvent, water, or mixtures thereof and, said milling media selected from the group consisting of dense sintered silicon carbide beads of about 1–2 millimeter size, fused boron carbide grit–14+32mesh size, and mixtures thereof, for a sufficient amount of time to obtain refined silicon carbide particles with a surface area greater than 15 m²/g and a median silicon carbide particle size less than 0.5 microns, and where less than 0.1 percent of the refined silicon carbide particles are greater than 1.5 microns;

forming a silicon carbide fiber with said refined silicon carbide particles; and sintering the silicon carbide fiber at a reduced sintering temperature to obtain a fine grained dense microstructure having a density greater than or equal to 2.98 g/cc.

* * * * *